May 25, 1926.
H. D. ALLEN
1,586,504
DIAL MECHANISM FOR TOY TELEPHONES
Filed Dec. 30, 1924      2 Sheets-Sheet 1
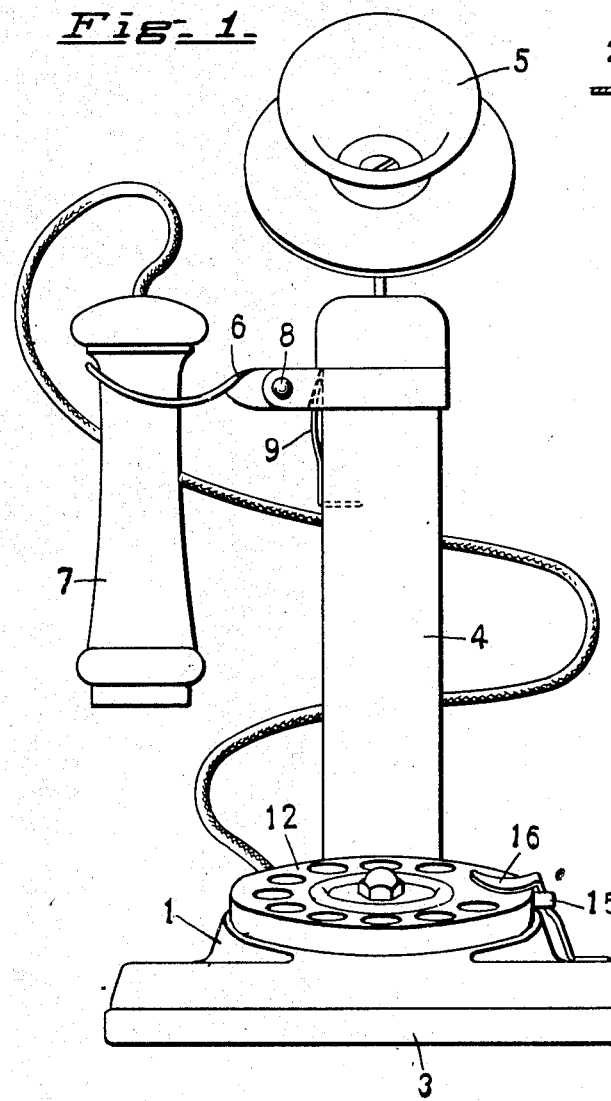
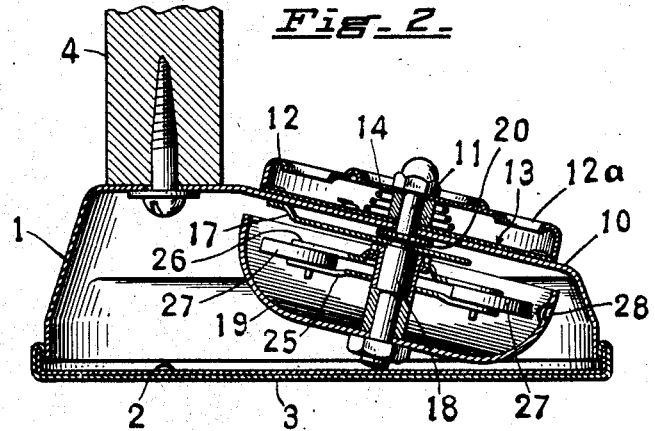
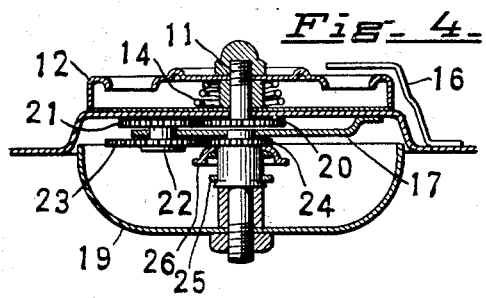
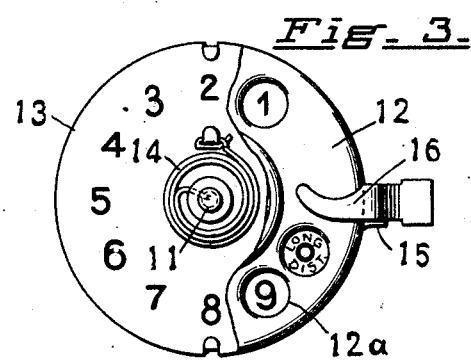
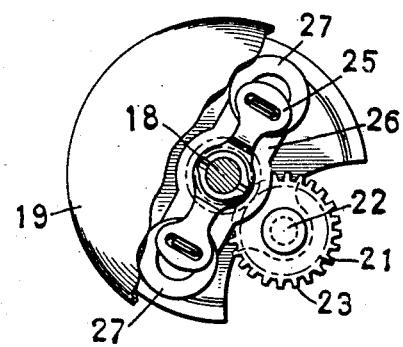
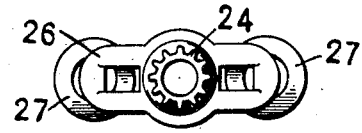
INVENTOR
Harold D. Allen,
BY
ATTORNEY May 25, 1926.

H. D. ALLEN 1,586,504

DIAL MECHANISM FOR TOY TELEPHONES

Filed Dec. 30, 1924    2 Sheets-Sheet 2

INVENTOR
Harold D. Allen,
BY
ATTORNEY

Patented May 25, 1926.

1,586,504

UNITED STATES PATENT OFFICE.

HAROLD D. ALLEN, OF EAST HAMPTON, CONNECTICUT, ASSIGNOR TO GONG BELL MANUFACTURING COMPANY, A CORPORATION OF CONNECTICUT.

DIAL MECHANISM FOR TOY TELEPHONES.

Application filed December 30, 1924. Serial No. 758,850.

This invention, as indicated by its title, relates to toys and is particularly designated in connection with toy telephones, although it is to be understood, that the mechanism may be used on toys, other than telephones, such, for instance, as radio sets or in fact, in any toy where a movable dial is a distinguishing feature along with a signalling device which is actuated by movement of the dial.

Although entitled and shown in connection with a toy telephone of the desk stand dial type, the mechanism may be employed in conjunction with other types of toys.

The object of the invention is to provide for certain features of educational value as well as those of amusement for a child. A further object is to provide a simple and compact mechanism which will operate with certainty to strike a signal whenever, the dial is rotated, permitting longer or shorter signals, depending upon the extent of movement of the dial.

The character of signal may be somewhat modified depending upon the speed with which the dial is moved. For instance, a comparatively long continuous ringing of the gong may be effected, or sharp loud tones, of shorter duration may be secured. In other words, the child, by manipulating the dial, at greater or less speeds and to a greater or less extent, may vary the character of the signals. This, in itself, provides an amusement feature which interests the child.

The educational value is derived from the numbers or insignia appearing on the movable dial, teaching the child to compile numbers and select them or to read the characters of the dial.

The mechanism herein described is somewhat similar to that illustrated in my co-pending application on toy dial telephone, Serial No. 664,399, but is of a simpler construction and has the features of freedom of action which permit the child greater latitude of selective operation in ringing the signal.

The mechanism is illustrated herein, in connection with what might be termed, a dummy type of telephone of the dial type. That is, the telephone has mechanical elements which function much after the fashion of the regular commercial phone but without electric features and electric connections.

It will be quite apparent that the mechanism is equally applicable, as an amusement device, whether mounted on the base of a telephone such as described, or upon any other suitable support where it may be employed to simulate an operable dial mechanism.

Referring to the drawings:

Fig. 1 is a view in elevation of a toy telephone with the mechanism in place on the base.

Fig. 2 is a cross sectional view through the base of the mechanism.

Fig. 3 is a plan view with a portion of the cover plate broken away.

Fig. 4 is a cross sectional view at right angles to the section of Figure 2.

Fig. 5 is a bottom plan view with parts broken away.

Fig. 6 is a detailed view of the striker.

Figure 7:
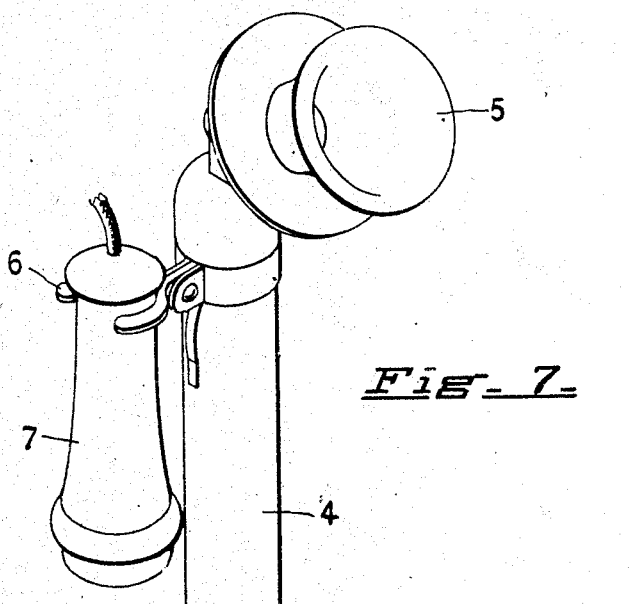
Fig. 7 illustrates a modified form of mechanism of somewhat simpler form than that of Figures 1 to 6, inclusive.

In my co-pending application referred to, an "escapement" and "verge" movement is employed, for moving a hammer to strike a gong, when the dial is released, and under spring tension, after it has been moved to one or another of its possible positions.

In the device here under consideration, the verge movement has been dispensed with and a clear sounding signal is attained, by arranging a stationary gong in conjunction with a rotary striker, the latter operated through a gear train upon movement of the dial in either direction.

In the mechanism illustrated in Figures 1 to 6, a rapid forward movement of the dial by the finger will throw strikers into operating positions to sound the gong while, if the gong is moved very slowly, there will be no signal sounding. On the other hand, when the dial is moved forward slowly and released, a spring rapidly rotates the dial in an opposite direction giving a clear brilliant sound. Similarly, if the dial is rotated rapidly by the finger, the strikers will sound the gong and upon release, the reacting spring will continue the ringing.

In Figures 6 to 9, inclusive, no retractile spring is employed for the dial and therefore, the operation of the striker is entirely controlled by the movement of the dial in both directions of rotation. In fact, it is possible to spin the dial or move it to any desired position in either direction, thus emitting various characters of signals. This latter modified form is of somewhat more simple construction than that illustrated in Figures 1 to 6, inclusive.

Referring to the drawings, the numeral 1, denotes a base or support for the dial and signal mechanism which, as illustrated, is the base of a telephone. This is encased by a cover plate 2, and preferably has a resilient covering 3, which gives an added finish and prevents scratching of furniture.

It is obvious that the base 1, and its dial signal mechanism is a complete unit structure for which many uses may be found in toy manufacture, although it is herein shown and designed to support a standard 4, which has, at its upper end, a transmitter 5, receiver hook 6, and receiver 7, all in simulation of the parts in a standard telephone set.

The receiver hook 6, is pivoted as at 8, and its inner end bears against a spring 9, which normally holds the receiver hook in horizontal position but permits a movement of the hook, thus simulating the movable hook of the standard telephone set. This permits the child to "rattle" the receiver hook as is often done in the ordinary phone when calling central.

As illustrated herein, the top of the base 10, or any suitable supporting element, has secured to it, and extending therefrom, a stud 11, upon which rotates the perforated dial 12. Below the perforated dial 12, there is a dial plate 13, which bears suitable numbers or other indicia visible through the dial openings 12ª, of the dial plate 12.

The disk 13, is suitably secured to the supporting element 10, and a spring 14, holds the dial plate 12, with its stop 15, in engagement with a finger stop 16. This holds the perforated dial 12, at one limit of its play and whenever it is rotated to bring a perforation up to the finger stop 16, a spring is tensioned to move the plate, in the opposite direction, upon release of the dial.

On the opposite side of the supporting plate 10, of the dial, there is a support 17, to which is secured a supporting post 18, and mounted thereon, a gong 19. This gong is stationary, that is, it is not rotated, while the stud 11, rotates with the dial 12.

On the under side of the support 10, secured to the stud 11, there is a gear 20, which meshes with a pinion 21, upon a stud 22, which passes through the plate 17. This stud 22, has a gear 23, which meshes with a pinion 24, of the rotary striker, which striker is sleeved on the support 18.

The rotary striker is of ordinary construction, having a pair of plates 25, 26, between the ends of which are free flying strikers 27. These strikers 27, fly outwardly under centrifugal action when the rotary striker is rotated to cause them to impinge upon a striker lug 28, of the stationary gong.

Figure 8:
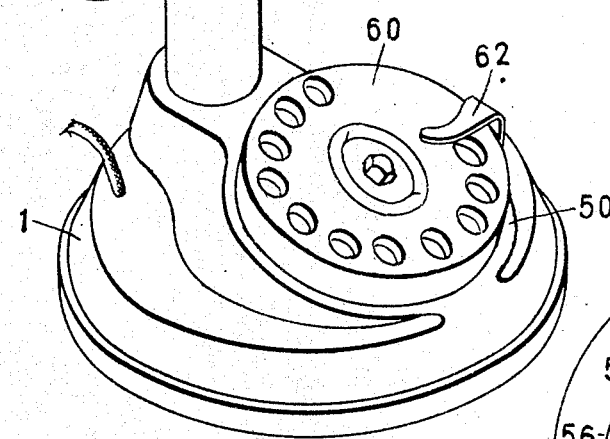
Fig. 8 is a cross sectional view.
Figure 9:
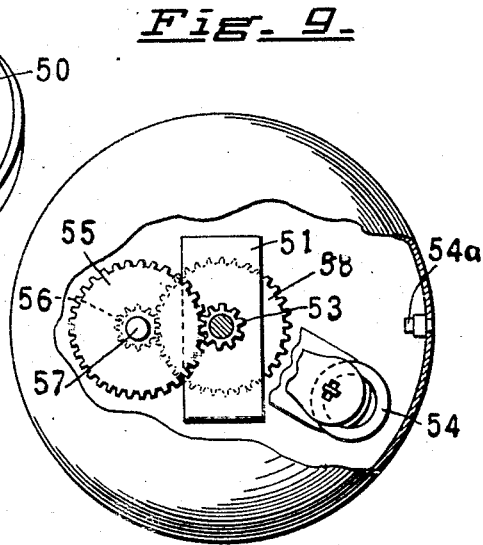
Fig. 9 is a bottom plan view with the gong broken away.

In Figures 7 to 9, inclusive, there is a slightly modified form of device in which the supporting plate 50, has secured thereto, a frame part 51, to which is secured a gong supporting post 52. Upon this post is mounted a rotary striker having a pinion 53, and free flying strikers 54, which impinge against the gong lug 54ª.

The pinion 53, meshes with a gear 55, fast with a pinion 56. Both the gear 55, and pinion 56 are mounted upon a stud 57, secured to the plate 50, and the pinion 56, meshes with a gear 58, which is secured to a stud 59, that supports the perforated dial plate 60. Below the dial plate is arranged a plate 61, which bears any suitable series of numbers or other indicia.

In this form of the device, there is no retractile spring for controlling the movement of the perforated dial said dial being free, to be moved, in either direction of rotation.

When used upon a toy telephone, as illustrated, it is preferred to have a finger stop 62, so that the different perforations of the dial plate may be brought to a stop where it is desired to singleize a group of figures to make a call number. The operation of the mechanism is at once apparent.

Whenever the perforated dial is rotated, the gear 58, meshing with the pinion 56, rotates the rotary striker through the intermeshing gear 55, and pinion 53.

This form of the device permits great latitude of action in sounding the signals. The dial may be moved forward and backward by the finger, to a greater or less extent, or may be spun in either direction, thus giving a greater latitude of play to the child using it.

I do not in this case claim a toy telephone including a transmitter and receiver supporting base and an automatic calling dial rotatably supported by the base, and a gong and striker mechanism supported by the base, and mechanical means for actuating the striker mechanism also supported by the base and mechanically connected with and responsive to rotation of the dial; nor a toy telephone of the dial type, having a rotatable dial, a signalling device co-operatively arranged with reference to the dial, and connections intermediate the dial and signalling device for sounding the latter upon partial movements of the dial, as these subjects matter are the basis of another, earlier, application filed by me on the 24th day of September, 1923, Serial No. 664,399, and therein claimed.

What I claim as my invention and desire to secure by Letters Patent is:—

1. In a dial mechanism for toys, in combination a supporting plate, a rotary dial shaft, a rotary dial secured to the shaft, a gong operatively mounted with reference to the shaft, a rotary striker for the gong, and gear and pinion connections between the shaft of the rotary dial and the rotary striker providing unbroken driving connections between the dial and striker during movement of the dial in either direction.

2. In a dial mechanism for toys, a supporting plate, a rotary shaft, a dial mounted on the shaft, a pinion secured to the shaft, a gong, a rotary striker for the gong having a pinion, a gear train intermediate said pinion and the pinion of the dial shaft providing an unbroken driving connection between the striker and the dial, and a spring for moving the dial and interconnected parts in one direction.

3. In a dial mechanism, for toys, in combination, a supporting plate, a rotary dial, a stationary gong, a rotary striker for the gong, and a gear train intermediate the striker and rotary dial, all of said parts operatively mounted on a supporting plate and co-operatively related to sound the gong upon rotation of the dial.

4. In a dial mechanism, for toys, in combination, a supporting plate, a rotary dial, a stationary gong, a rotary striker for the gong, a spring for rotating the dial in one direction, and a gear train intermediate the striker and rotary dial, all of said parts operatively mounted on the supporting plate and co-operatively related to sound the gong upon movement of the rotary dial.

5. In a dial mechanism for toys, in combination, a supporting plate, a rotary dial stud, a rotary dial secured to said stud, a pinion secured to said stud, a gong supporting stud operatively secured to the supporting plate, a nonrotary gong mounted thereon, a rotary striker for the gong, and gear and pinion connections between the pinion of the rotary dial and the rotary striker.

6. In a dial mechanism for toys, a supporting plate, a rotary dial stud mounted thereon, a rotary dial mounted on the stud, a pinion secured to the stud, a gong support secured to the supporting plate, a gong nonrotatably mounted on the support, a rotary striker for the gong having a pinion and gear train intermediate said pinion and the pinion of the rotary dial stud.

7. In a dial mechanism for toys, a supporting plate, a rotary dial stud mounted thereon, a rotary dial mounted on the stud, a pinion secured to the stud, a gong support secured to the supporting plate, a gong nonrotatably mounted on the support, a rotary striker for the gong having a pinion, gear train intermediate said pinion and the pinion of the rotary dial stud, and a spring for moving the dial and interconnection parts in one direction of rotation.

HAROLD D. ALLEN.